United States Patent [19]

Nicol et al.

[11] 3,829,768

[45] Aug. 13, 1974

[54] SUPERCONDUCTING GRADIOMETER FOR MEASURING FIRST AND SECOND DERIVATIVES OF A MAGNETIC FIELD

[75] Inventors: James Nicol, Dover, Mass.; Sidney Shapiro, Rochester, N.Y.; Martyn F. Roetter, Cambridge, Mass.

[73] Assignee: The United States of America as represented by the Secretary of the Navy, Washington, D.C.

[22] Filed: Sept. 4, 1973

[21] Appl. No.: 394,430

[52] U.S. Cl............................ 324/43 R, 324/4, 324/8
[51] Int. Cl............................................. G01r 33/02
[58] Field of Search........................... 324/43 R, 4, 8

[56] References Cited
UNITED STATES PATENTS 3,528,005  9/1970  Morse et al. .................. 324/43 R 3,758,854  9/1973  Zimmerman ..................... 324/43 R Primary Examiner—Stanley T. Krawczewicz
Attorney, Agent, or Firm—R. S. Sciascia; L. I. Shrago

[57] ABSTRACT

The first and second derivatives of a magnetic field are measured by two pairs of spaced superconducting sensing coils which are aligned along a common axis with the individual coils of each pair connected in electrical opposition so that the net current flowing therethrough is proportional to the gradient of the magnetic field in which these pairs are disposed. Superconducting switches associated with these coils are selectively operated to direct these net currents through a superconducting field coil during mutually exclusive time intervals. The resultant magnetic field is measured by a magnetometer which provides an indication of the average value of the magnetic field gradient and the second derivative thereof.

9 Claims, 4 Drawing Figures

SUPERCONDUCTING GRADIOMETER FOR MEASURING FIRST AND SECOND DERIVATIVES OF A MAGNETIC FIELD

The present invention relates generally to magnetic gradiometers, and, more particularly, to a superconducting gradiometer which provides a measure of both the first and second spatial derivatives of a magnetic field.

Recently developed superconducting magnetic field sensors have sensitivities several orders of magnitude greater than, for example, conventional flux gate and optically pumped magnetometers. Since these sensors may have volumes of the order of only a few cubic millimeters, they can be readily utilized in airborne systems for magnetic anomaly detection. Also, these sensors permit the simultaneous measurements of the first and second spatial derivatives of the magnetic field and, thus, make possible the instantaneous calculation of the range, bearing and magnetic moment of a magnetic anomaly to the extent that it can be described as a magnetic dipole.

It is, accordingly, a primary object of the present invention to provide a superconducting gradiometer for magnetic anomaly detection.

Another object of the present invention is to provide an arrangement of superconducting gradiometers which provides a measurement of the first and second spatial derivative of a magnetic field.

Another object of the present invention is to provide a gradiometer which utilizes superconducting components and interconnections and requires only a single magnetic field measuring device for providing an indication of the magnitude of the first and second spatial derivatives of a magnetic field.

Other objects, advantages and novel features of the invention will become apparent from the following detailed description of the invention when considered in conjunction with the accompanying drawings wherein.

Briefly, and in general terms, the above objects of invention are accomplished by utilizing a first and second pair of superconducting magnetic sensing coils which are disposed along a common axis. Each pair of coils constitutes the magnetic field sensing portion of a first derivative magnetic gradiometer. Hence, both coils of each pair are connected in electrical series opposition so that the net current flowing therethrough is proportional to the gradient in the magnetic field in which these coils are disposed. Consequently, the average value of the first derivative of this magnetic field corresponds to the average of the two currents so produced. Likewise, the difference between these currents is proportional to the spatial second derivative of the magnetic field.

In order to measure these currents, two separate magnetometers are usually required, and the measurements so obtained must be subtracted to arrive at the second derivatives. In the present invention, only one magnetic field measuring device is needed. Because of this, the complexity and cost of the overall apparatus is reduced. To realize this improvement, the system contains superconducting switches and by selectively regulating their superconducting status, the two net currents are measured during mutually exclusive time intervals.

Figure 1:
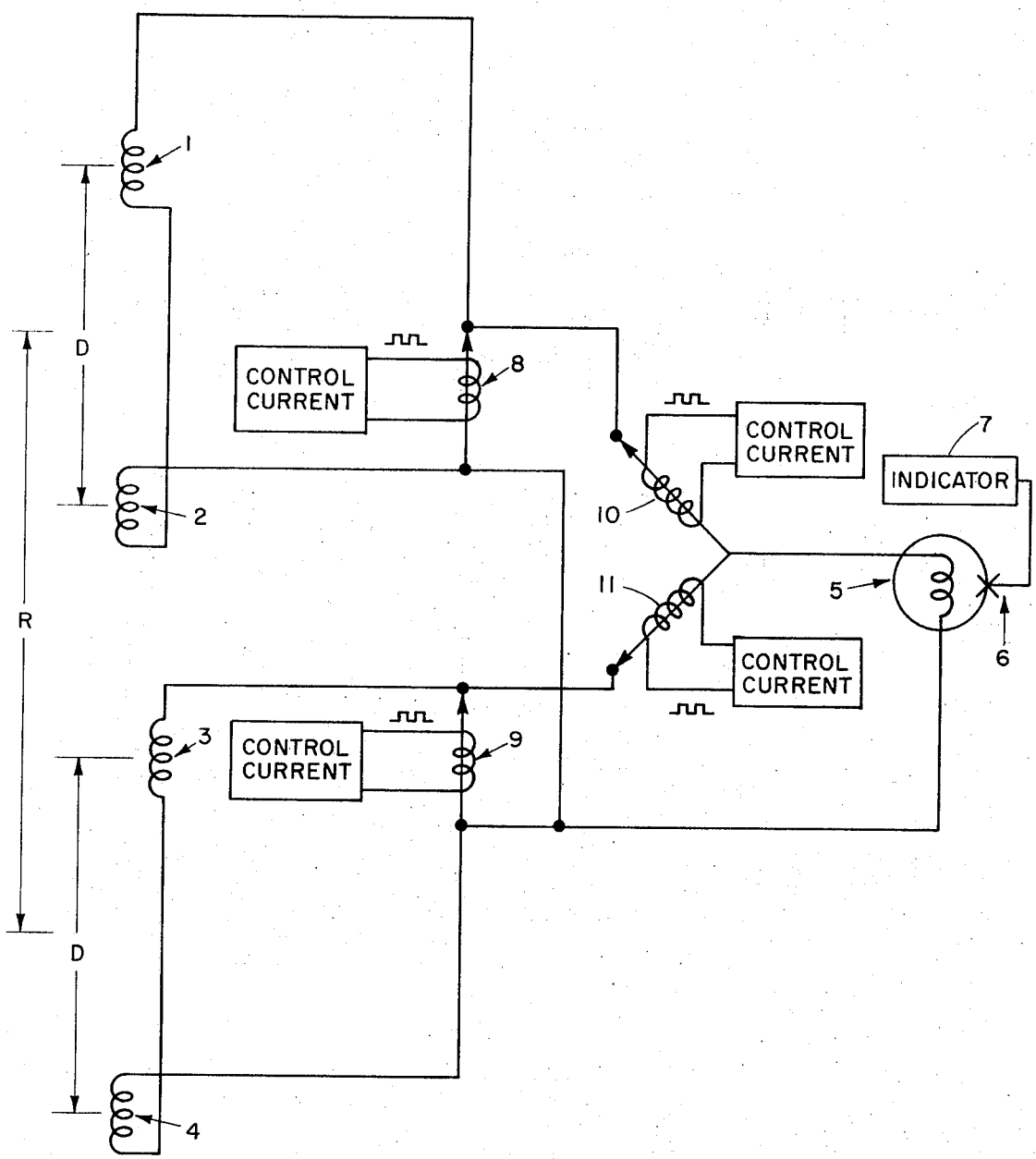
FIG. 1 is a schematic diagram of one embodiment of the invention.

Referring now to FIG. 1 of the drawings, two substantially identical magnetic field sensing coils 1 and 2 made of superconducting material and maintained in a superconducting status are aligned a distance $d$ apart along a common axis. These coils are preferably of relatively large size and arranged to have small mutual inductance. Additionally, they are connected in electrical series opposition so that any net current flowing therein induced by a common magnetic field is proportional to the gradient in the field component which is parallel to their common axis.

A second pair of substantially identical superconducting field sensing coils 3 and 4, spaced the same distance $d$ apart, are also aligned along the above common axis. These coils, which are similar to those previously mentioned, are likewise relatively large and have small mutual inductance. By the same token, they are maintained in a superconducting status and connected in electrical series opposition so the net current flowing therein induced by a common magnetic field is proportional to the gradient in the field component parallel to their common axis.

These net currents, as will be seen hereinafter, are selectively switched through a superconducting drive coil 5, and the magnetic field created thereby is measured by a magnetometer 6 which includes an indicating device 7. More specifically, a superconducting switch 8 is connected directly across the series combination of coils 1 and 2, while a superconducting switch 9 is directly connected across the series combination of coils 3 and 4. One side of drive coil 5 is directly connected to one common side of both of the series circuits, while the other side thereof is connected through superconducting switches 10 and 11 to the other sides of these same series circuits. All the various interconnecting lines are made of superconducting material and are maintained in a superconducting status.

Each of the cryotron switching devices, as is well known, may be changed from a superconducting to a resistive status by controlling the intensity of a localized magnetic field which surrounds the central wire of the switch. When this field reaches a critical value, the normal resistance returns to this central wire, and the switch is in an "open" condition. When the magnetic field is lowered, this resistance disappears, and the switch is "closed". All of the switching elements in FIG. 1 are shown as if in a conventional closed condition, but their true status, it will be recognized, is determined by the presence or absence of an appropriate current switching pulse through their control winding.

In the operation of the system of FIG. 1, cryotron switches 10 and 11 sequentially connect drive coil 5 across field coils 1 and 2 and 3 and 4 as they are driven back and forth between a superconducting and resistive state by appropriate current pulses applied to their control windings from a suitable external source. When switch 10 is in a resistive state, switch 8 is in a superconducting state, shunting coils 1 and 2. Switch 9 is in a resistive state, and switch 11 is in a superconducting state. Thus, the net current flowing through coils 3 and 4 is directed through drive coil 5 and measured by magnetometer 6. This magnetometer may be of the Josephson type.

In the other part of the cycle, switches 9 and 10 are transformed to a superconducting state and switch 8 to a resistive state. Coils 3 and 4 are shunted, and the net current circulating through coils 1 and 2, which now flows through drive coil 5 in the same direction as the previous net current, is measured by magnetometer 6.

It should be pointed out that the various switching operations must be timed so that the field coils that are being utilized, namely, those that are not shunted, always form part of a circuit that is totally superconducting. Thus, switch 8 must always be closed before 11 and switch 9 before 10. Also, switches 10 and 11 should be totally in a superconducting state before one of switches 8 and 9 is opened.

Figure 2:
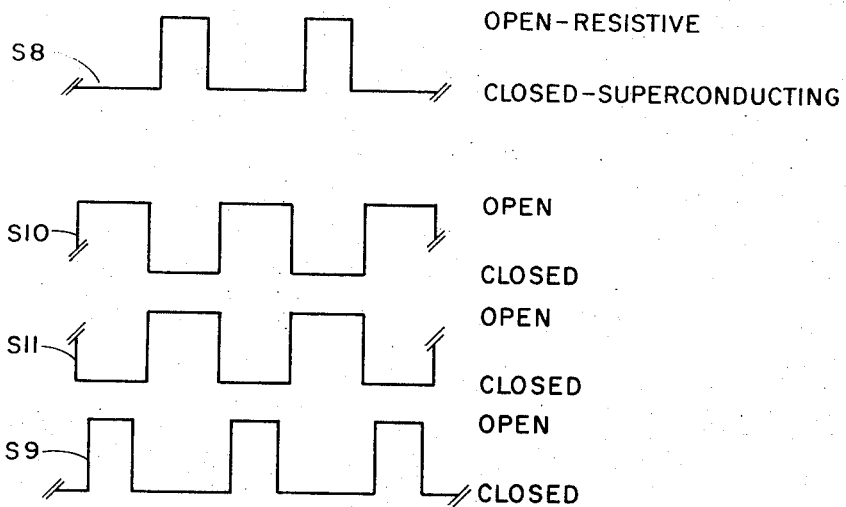
FIG. 2 shows the current pulse trains which control the various superconducting switching elements of FIG. 1.

Referring now to FIG. 2 which shows a series of current pulse trains which may be utilized to control the various switches, it will be seen that pulse train s8 periodically changes switch 8 from a superconducting to a resistive state as the amplitude of this train changes from zero to a predetermined positive value. Pulse trains s9, s10 and s11, similarly, control switches s9, s10 and s11, changing their status from superconducting to resistive as the amplitudes of these pulses shift between zero and a positive value.

As noted hereinbefore, switch 8 should be changed from a superconducting to resistive state only after switch 10 has already gone superconducting. Additionally, it should be changed back to superconducting before switch 10 becomes resistive. This mode of operation is achieved by fitting in the shorter open periods of switch 8 into the longer superconductive or closed periods of switch 10. By the same token, the open periods of switch 9 are fitted into the superconductive or closed periods of switch 11. And, finally, the similar pulse trains s10 and s11 are arranged to be out of phase so that whenever switch 10 is open, switch 11 is closed.

Figure 3:
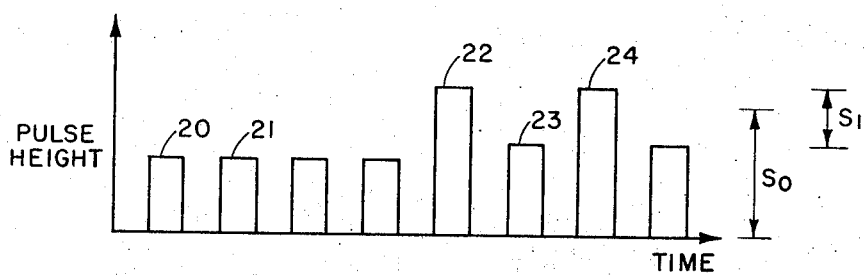
FIGS. 3 and 4 show the output wave forms which may be produced by the different modes of operation of the apparatus of FIG. 1.

The output of magnetometer 6, as presented by indicator 7, provides information on the average field gradient and the second derivative of the magnetic field. If switches 10 and 11 are transformed from a superconducting to a resistive state at regular time intervals T, then the output of the magnetometer will be a series of pulses of width T. If the external magnetic field gradient is uniform over the four magnetic sensing coils 1, 2, 3, 4, the outputs from each pair of coils will be the same. This condition is illustrated by the first series of equal amplitude pulses 20 and 21 in FIG. 3, which is a plot of pulse amplitude versus time. The constant amplitude of these pulses is, thus, an indication of a uniform field gradient. If there is a non-zero second derivative then the outputs from the two sets of field coils will not be the same, and this condition is illustrated by the varying amplitude pulses 22, 23 and 24. This last series of unequal amplitude pulses may be interpreted as the sum of a constant signal $s_o$ and a varying signal $s_1$. The amplitude of $s_o$ is a measure of the average field gradient and the amplitude of $s_1$, a measure of the second derivative.

Figure 4:
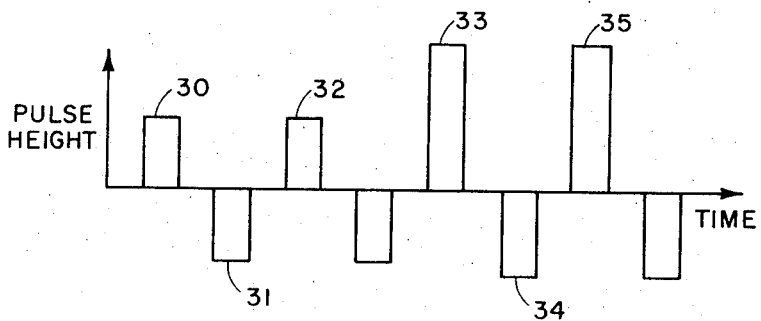

As indicated hereinbefore, the arrangement of FIG. 1 results in the two net currents flowing through drive coil 5 in the same direction. However, the various sensing coils may be connected so that these currents flow through this coil in opposite directions. If this is the case then as shown in FIG. 4, a magnetic field of constant gradient will produce an output signal such as 31, 32 that is symmetrical about the zero voltage axis. If a second spatial derivative is present, this condition will be indicated by pulses 33, 34, 35 and the presence of a dc component $s_1$. The amplitude of the alternating component $s_o$ will be a measure of the average field gradient.

What is claimed is:

1. Apparatus for measuring magnetic fields comprising:

a first pair of spaced superconducting magnetic field sensing coils aligned along a common axis;

a second similar pair of spaced superconducting magnetic field sensing coils also aligned along said axis;

said second pair of coils being spaced from said first pair of coils with the individual coils of each pair being separated the same distance apart and being connected in a series circuit in electrical opposition such that the net current flowing through each series circuit is proportional to the gradient of the magnetic field within which each pair is disposed; and means for measuring the magnitude of each net current during mutually exclusive time intervals whereby the difference of said magnitudes is indicative of the second derivative of said magnitude field and the average of said magnitudes is indicative of the average gradient of said magnetic field.

2. In an arrangement as defined in claim 1 wherein said means for measuring the magnitude of each net current includes a superconducting drive coil; and means for switching each net current through said drive coil during mutually exclusive time intervals.

3. In an arrangement as defined in claim 2 means for measuring the magnitude of each net current includes a magnetometer for measuring the intensity of the magnetic field produced by said superconducting drive coil in response to a net current flowing therethrough.

4. In an arrangement as defined in claim 2 wherein said means for switching includes superconducting switches which connect said drive coil either across one of said series circuit or the other of series circuit.

5. In an arrangement as defined in claim 4 wherein said means for switching includes additional superconducting switches which are controlled so as to shunt that one of said series circuits which is not connected to said drive coil.

6. In an arrangement as defined in claim 2 wherein each net current is switched through said superconducting drive coil in the same direction.

7. A magnetic field gradiometer comprising:

a first pair of superconducting magnetic field sensing coils aligned along a common axis and interconnected in electrical opposition in a first superconducting series circuit whereby the net current flowing through said first series circuit is proportional to the gradient of magnetic field within which said pair of sensing coils is positioned;

a second similar pair of superconducting magnetic field sensing coils aligned along said common axis and interconnected in electrical opposition in a second superconducting series circuit whereby the net current flowing through said second series circuit is proportional to the gradient of the magnetic field within which said second pair of coils is positioned; and a superconducting drive coil; and means for connecting said drive coil alternately across said first and second series circuits whereby the net current flowing through each series circuit flows through said drive coil during mutually exclusive time periods; and means for measuring the intensity of the magnetic field produced by said drive coil, the difference in intensity of said last-mentioned field due to any inequality in said net currents being indicative of the second derivative of said magnetic field, and the average value of this magnetic field being indicative of the average of the gradient of the magnetic field within which said first and second pairs of sensing coils are positioned.

8. In an arrangement as defined in claim 7 means for shunting that series circuit which is not connected across said drive coil with a superconducting switch whereby the net current flowing through this series circuit is prevented from flowing through said drive coil.

9. A magnetic field gradiometer comprising:

a first pair of superconducting magnetic field sensing coils aligned along a common axis and interconnected in electrical opposition in a first superconducting series circuit whereby the net current flowing through said first series circuit is proportional to the gradient of magnetic field within which said pair of sensing coils is positioned;

a second similar pair of superconducting magnetic field sensing coils aligned along said common axis and interconnected in electrical opposition in a second superconducting series circuit whereby the net current flowing through said second series circuit is proportional to the gradient of the magnetic field within which said second pair of coils is positioned; and a superconducting drive coil; and means for switching each net current through said drive coil during mutually exclusive time intervals whereby the magnetic field produced by said drive coil is related to the magnitude of each net current, said last-mentioned means including a first superconducting switch connected across said first series circuit, a second superconducting switch connected across said second series circuit, a third superconducting switch connecting one side of said drive coil to one side of one of said series circuits, and a fourth superconducting switch connecting said one side of said drive coil to a corresponding side of the other of said series circuits, the other side of said drive coil being connected to both other sides of said series circuits;

means for maintaining said third switch in a superconducting status while said fourth switch is maintained in a resistive status and vice versa; and means for maintaining said first switch in a resistive status during part of the time said third switch is in a superconducting status and said second switch in a resistive status during part of the time said fourth switch is in a superconducting status.

* * * * *